April 28, 1942.   H. S. DUEY   2,281,145
PIPE PLUG
Filed Nov. 28, 1939   2 Sheets-Sheet 1
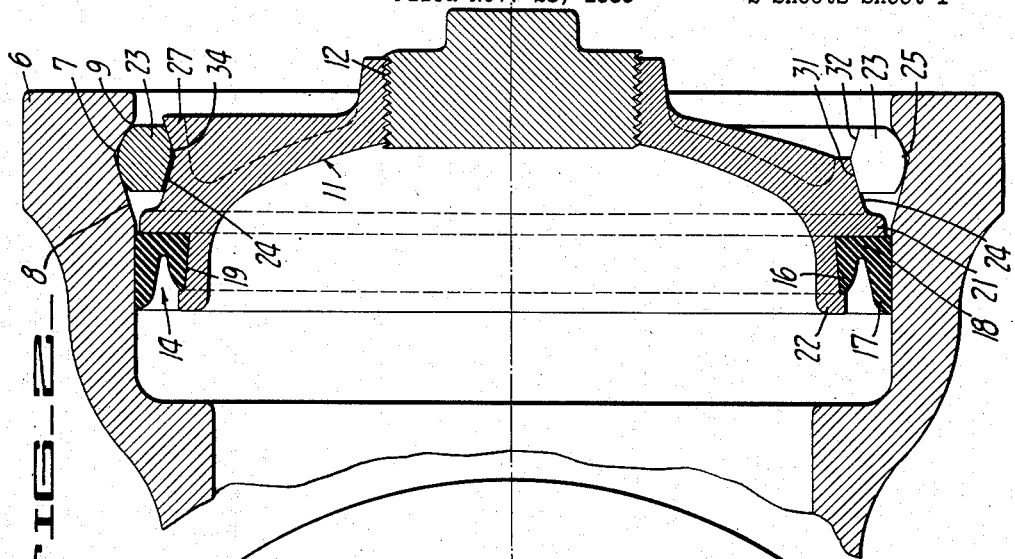
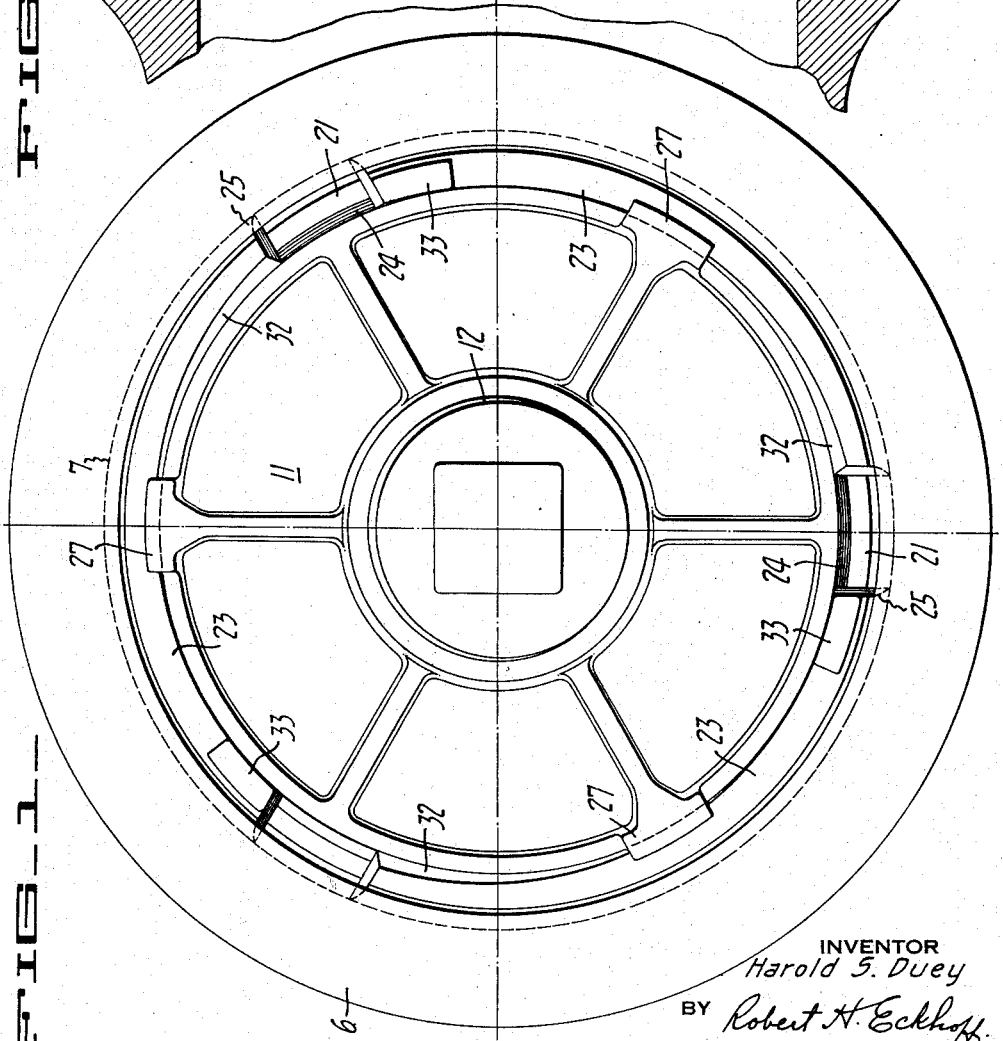
INVENTOR
Harold S. Duey
BY Robert H. Eckhoff
ATTORNEY April 28, 1942.   H. S. DUEY   2,281,145
PIPE PLUG
Filed Nov. 28, 1939   2 Sheets-Sheet 2
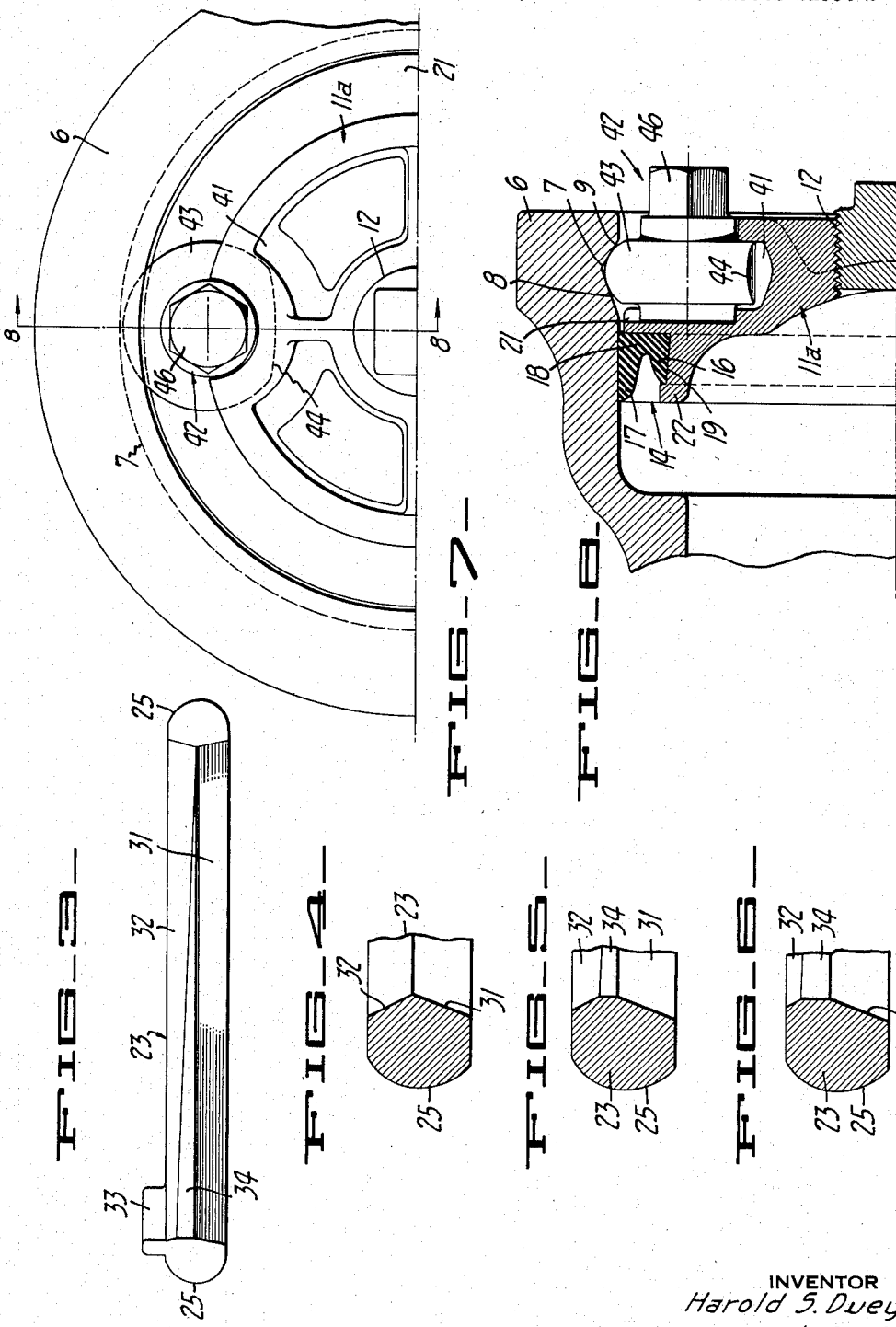
INVENTOR
Harold S. Duey
BY Robert H. Eckhoff
ATTORNEY Patented Apr. 28, 1942

2,281,145

UNITED STATES PATENT OFFICE 2,281,145

PIPE PLUG

Harold Stewart Duey, Los Angeles, Calif.

Application November 28, 1939, Serial No. 306,512

3 Claims. (Cl. 220—55)

This invention relates to a means for effecting the closure of a tube or pipe. It is particularly concerned with the provision of closure means for what can be simply described as the standard bell ended cast iron pipe commonly and widely employed in domestic water distribution systems. Previous plugs intended for use in this field required machining and machine fitted parts, bolts, screws, nuts, and other expensive accessories. The pipe plug of this invention can be made up of a few cast parts ready for use without machining. In addition, it can be installed or removed very quickly, a minute or so, and, when removed, it is usable again.

In general, it is the broad object of the present invention to provide a relatively simple, inexpensive, and improved plug or seal for bell ended pipe which can be installed quickly in the pipe as a temporary or a permanent seal.

The invention includes other objects and features of advantage, some of which, together with the foregoing, will appear hereinafter, wherein the present preferred form of the invention is disclosed.

In the drawings accompanying and forming a part hereof

Figure 1 is a plan view of the plug installed.

Figure 2 is a transverse section through the plug when installed.

Figure 3 is a side elevation of an arcuate wedge employed with the plug while Figures 4, 5 and 6 are sections through the wedge.

Figure 7 is a partial plan view of a plug having a modified form of wedge while Figure 8 is a section along the line 8—8 of Figure 7.

Referring to the drawings, the numeral 6 is applied to the common standard bell end of a cast iron water or gas pipe or any other standard fitting. The details of construction of this bell are the subject of specifications closely followed by the various manufacturers. Particular attention is called to groove 7 which is standard in this form of fitting. It is to be noted that this groove includes two connected faces 8 and 9 and these faces are at such an angle to each other that the groove is formed thereby with both faces extending inwardly toward the center of the pipe. The bell and groove are standard in this type of pipe and the fittings employed therewith. In high pressure lines and fittings there may be two grooves instead of one. The seal of this invention can be readily adapted for installation in these as well.

In accordance with this invention I provide a closure head generally indicated by numeral 11 and adapted to fit within the bell on the pipe to substantially fill the bell. The head is made of any suitable material such as cast iron, cast steel, bronze, etc. In this connection it is to be pointed out that the construction of the present invention enables the head 11 to be made of cast iron and to be cast directly to size so that machine work is unnecessary. If desired, the head can be blind or tapped as at 12 for attachment of a screwed fitting, a gauge, or other device as desired.

Means are provided for sealing the closure member against fluid passage. This means comprises a resilient member 14 generally made in any suitable form of rubber or other suitable flexible material resistant to the gas or liquid in the pipe. Preferably the resilient closure 14 is so fashioned that fluid under pressure in the pipe is effective to force the member into sealing engagement with the closure member 11 and with the adjacent bell 6 of the pipe, although the closure can be made of circular or rectangular cross section. Thus, the closure member 14 is so fashioned that fluid pressure is effective on its several portions to force them to engage both bell and head. A successful form I have employed was made generally U-shaped in outline, with an inner leg 16, an outer leg 17, and a base portion 18. In the particular form shown, the legs are of unequal length, the outer leg or rim on the member 14 being longer to insure adequate sealing engagement between the U-member and the interior face of the pipe bell. The inner leg or rim 16 and the base 18 of the U-member are respectively seated in engagement with face 19 on the closure head 11 and with flange 21 thereon which limits movement of the U-member. A bead 22 is provided adjacent the face 19 so that when the annular resilient member is snapped into place over the bead it is retained.

Means are provided for retaining the closure head in position in the bell groove, the retaining means being adapted for placement between the head and the groove 7 in the bell. This placement means preferably takes the form of two or more circular segments or wedges 23, each of which is adapted to be inserted between faces 8 and 9 and face 24 on the head member. When fluid pressure is placed on the plug the wedges 23 retain the head in position. Each wedge has a rounded face 25 and a flat face 31 shown in the drawings as complementary to faces 8 and 9 and face 24 with a face 32 engaging one of the lugs 27. Usually the faces are not made quite complementary; each segment is distorted slightly by the pressure and faces 8, 9 and 24 will be engaged.

In practice the arcuate segments 23 for each plug are preferably cast in ring form with frangible connection portions (not shown) between each segment. These portions are readily fractured and the segments separated. The frangible connections are used for convenience in handling before use. Lugs 27 assist in retaining the segments during and after placement in the bell until fluid pressure is placed on the plug.

The plug of the present invention can be installed in less than a minute by inserting the head in the bell with the seal in place and lining up the lugs 27 with the groove in the pipe bell. The arcuate wedge segments 23 are then placed behind the lugs in the groove after having been broken apart. The wedges are slipped around in the bell groove until firmly in place by lightly tapping projections 33 with a hammer. Upon fluid or gas pressure being placed against the closure it is wedged tightly in position. No blocks or outside clamps are necessary. Because of the flexible nature of the member 14 as much as a total variation of ⅜ths inch can be cared for in the internal diameter of the pipe bell.

When it is desired to remove the plug the reverse operation is followed, that is, the wedges are tapped until they can be removed, whereupon they are slipped out from between the head and the bell, and the whole plug can be withdrawn. The member 14 can be made of any suitable material to resist corrosion by the fluid in the pipe. In water service the life of the rubber is practically unlimited. If anything does happen to the seal it can be readily replaced at very low cost and the other portions of the plug re-employed.

To ensure that the closure is retained in position during periods when fluid pressure is absent or very low the faces 31 and 32 preferably are so fashioned that they are divergent and a face 34 is provided along the inside of each circular segment or wedge 23. Face 32 engages lug 27 on the closure to lock the head in position, and ensure its retention even though no fluid pressure is on the head. This is important because otherwise earth pressure, for example, might displace the head.

In Figures 7 and 8 I have shown a modified locking means. The head 11a is cast with a plurality of receptacles 41 therein for a rotatable member 42 having an enlarged portion 43 with a spiral circular or V face rotatable in the receptacle 41. The member is cut away as at 44 to permit it to be readily positioned when the head is in place. A wrench applied to each member head 46 serves to rotate each member and place its portion 43 in engagement with groove 7 to retain the closure in engagement with the bell 6 as long as is desired.

I claim:

1. A plug for insertion in an internally grooved bell on a pipe to close the pipe in conjunction with a sealing resilient member carried by the plug, said pipe having a continuous lip thereon adjacent the end of said pipe and defining one side of said groove, said plug comprising a circular head member adapted to be inserted in said bell, said head member having a portion of its peripheral surface recessed, and a plurality of separate locking members adapted to be inserted between a recessed portion of said head member and said continuous lip on said bell when said head member is in position in said bell, each locking member having an outer convex face and an inner flat angular face engaging respectively said groove in said bell and a face on said recessed head member to secure said head member in position in said bell.

2. A plug for insertion in an internally grooved bell on a pipe to close the pipe in conjunction with a sealing resilient member carried by the plug, said plug comprising a circular head member adapted to be inserted in said bell adjacent said groove, said head member having a portion of its peripheral surface recessed cooperatively adjacent said groove when said member is in said bell, and a plurality of elongated arcuately formed segmental locking members, each member having an outer arcuate face thereon adapted to engage and fit in said bell groove and having a plurality of flat angular faces on its inner side and adapted, upon a sliding movement of said segment between said head member and said grooved bell, to lock the head member in the bell.

3. A plug for insertion in an internally grooved circular bell on a pipe to close the pipe in conjunction with a sealing resilient member carried by the plug, said pipe having a continuous outer lip thereon extending away from and defining one side of the groove in said bell, said plug comprising a circular head member adapted to be inserted in said bell adjacent said groove, said head member having a portion of its peripheral surface recessed cooperatively adjacent said groove when said member is in said bell, and a plurality of elongated arcuately formed segmental locking members insertable between said head members and said bell lip, each member having cooperating outer and inner faces thereon respectively engaging said grooved bell and said recessed head member to lock said head member in the bell upon a sliding movement of the locking member between the grooved bell and the head member while said bell and said head member are substantially stationary relative to each other.

HAROLD STEWART DUEY.